United States Patent

Mori et al.

[15] 3,696,202

[45] Oct. 3, 1972

[54] OPTICAL SYSTEM FOR A COLOR TELEVISION CAMERA

[72] Inventors: Minoru Mori; Toshiro Kishikawa, both of Ohmiya, Japan

[73] Assignee: Fuji Shashin Koki Kabushiki Kaisha, Saitama-ken, Japan

[22] Filed: Oct. 8, 1970

[21] Appl. No.: 79,110

[30] Foreign Application Priority Data

Oct. 16, 1969 Japan......................44/83039

[52] U.S. Cl. ..........................................178/5.4 ST

[51] Int. Cl...............................................H04n 9/06

[58] Field of Search.......................178/5.4 R, 5.4 ST

[56] References Cited

UNITED STATES PATENTS 2,696,520 12/1954 Bradley.................178/5.4 ST

OTHER PUBLICATIONS

Hayashi et al., " Recent Developments of Color Television Cameras at NHK," NHK Laboratories Note, No. 113, Sept. 1967.

*Primary Examiner*—Richard Murray
*Attorney*—Fleit, Gipple & Jacobson

[57] ABSTRACT

A color television camera, comprising a taking lens, an image tube having a photoelectric surface, a monochrome stripe filter positioned at the focal point of said taking lens, a relay lens to form the light passing through said filter into a parallel light, dichroic means having three dichroic surfaces for separating the light from said relay lens into three color lights and directing said respective color lights at angles slightly from each other, and a second relay lens for focussing the ray pencil from said dichroic means on the photoelectric surface of said image tube.

7 Claims, 9 Drawing Figures

PATENTED OCT 3 1972 3,696,202

Minoru Mori
Toshiro Kishikawa
INVENTORS

BY
Fleit, Gipple & Jacobson
ATTORNEYS

OPTICAL SYSTEM FOR A COLOR TELEVISION CAMERA

The present invention relates to a color television camera of the type using a stripe filter in the chrominance channel system.

A color television camera of the type wherein three chrominance channel are taken out by causing the white light from a taking lens to form an image on a single image tube after passing it through a stripe filter comprising stripes of red, green and blue colors arranged in sequence, instead of causing the color light, separated into three colors of red, green and blue by a color separating mirror or a prism, to form images on three separated image tubes, has been proposed.

This type of color television cameras include one in which the light passing through a taking lens is caused to form an image on the above-mentioned stripe filter and the light from the stripe filter is passed through a relay lens and again caused to form an image on the photoelectric surface of a single image tube. The stripe filter has red, green, blue and black stripes repeatedly arranged thereon in substantially the same width, and 80 to 100 sets of these four stripes are usually formed on the filter. In this type of color television camera, if it is possible to form the stripes on the photoelectric surface of the image tube, the relay lens could be eliminated, but such an arrangement is technically impossible. An attempt to get the stripe filter as close to the photoelectric surface of the image tube as possible is also met with an unsatisfactory result by reason of the fact that a face plate is positioned in front of the photoelectric surface of the image tube.

As the stripe filter, an absorption type color filter and a multi-layer filter can be used, but the use of the absorption type color filter results in a great loss of light quantity, though the production thereof is relatively easy, whereas the multi-layer filter is extremely difficult to product, though the loss of light quantity is small. Furthermore, in these stripe filters, the width of the stripes cannot be reduced beyond a certain limit and hence the image resoluting power of the stripe filters is limited. Therefore, it is impossible to make the size of picture on the stripe surface smaller than a certain size. Consequently, the optical system including the taking lens becomes large in size and the cost of the camera becomes high.

The primary object of the present invention is to obtain the same result as obtainable from the expensive color stripe filter, by the use of a monochrome stripe filter.

Another object of the invention is to substantially improve the resolving power and the color reproducing effect of a color television camera comprising only one image tube, without increasing the size of the camera.

Still another object of the invention is to reduce the production cost of a color television camera comprising only one image tube.

According to the present invention there is provided a color television camera which comprises a taking lens, an image tube having a photoelectric surface, a monochrome stripe filter positioned at the focal point of said taking lens, a relay lens to form the light passing through said filter into a parallel light, dichroic means having three dichroic surfaces for separating the light from said relay lens into three color lights and directing said respective color lights at angles slightly different from each other, and a second relay lens for focussing the ray bundle from said dichroic means on the photoelectric surface of said image tube.

According to an aspect of the invention, the monochrome stripe filter consists of transparent stripes of equal width formed on a black color plate in equally spaced relation, the width of said transparent stripes being one third of the width of the black stripe formed between adjacent ones of said transparent stripes. The white light passing through each stripe is separated into three color lights by the dichroic means and each color light is focussed on the photoelectric surface of the image tube in adjacent relation to each other.

With such arrangement, a color image is continuously formed on the photoelectric surface, which consists of stripes of three color lights and black stripes of the same width as the width of said color stripes.

The dichroic means preferably has three dichroic reflecting surfaces, the angles of inclination which slightly differ from each other, and these dichroic reflecting surfaces may be arranged such a way that the angles of inclination thereof become larger successively or in a reverse way, or in such a way that the central dichroic reflecting surface has the largest or smallest angle of inclination. The difference in angle of inclination between the adjacent dichroic reflecting surfaces is so selected that the color lights reflected on the respective surfaces are focused on the photoelectric surface in adjacent relation to each other.

According to another aspect of the invention second dichroic means is arranged between the taking lens and the monochrome stripe filter, which is adapted to pass only one of the three color lights while reflecting the other color lights, and the lights reflecting on said second dichroic means pass through said monochrome stripe filter, and further a second image tube is provided for receiving said one color light passing through said second dichroic means. In this case, the monochrome stripe filter includes alternately arranged black stripes and transparent stripes, and the width of said transparent stripes is preferably the half of the width of said black stripes. The second image tube acts to generate a luminance signal.

Further, in the present invention a prism may be combined with the dichroic means to eliminate a color shading problem on the dichroic reflecting surface.

The monochrome stripe filter used in the present invention can be produced simply by a known method, such as photographic etching.

Although the present invention can be practised in a variety of modes, a preferred embodiment thereof will be described with reference to the accompanying drawings. In the drawings.

Figures 1, 2, 3, 4, 5, 6, 7, 8, 9:
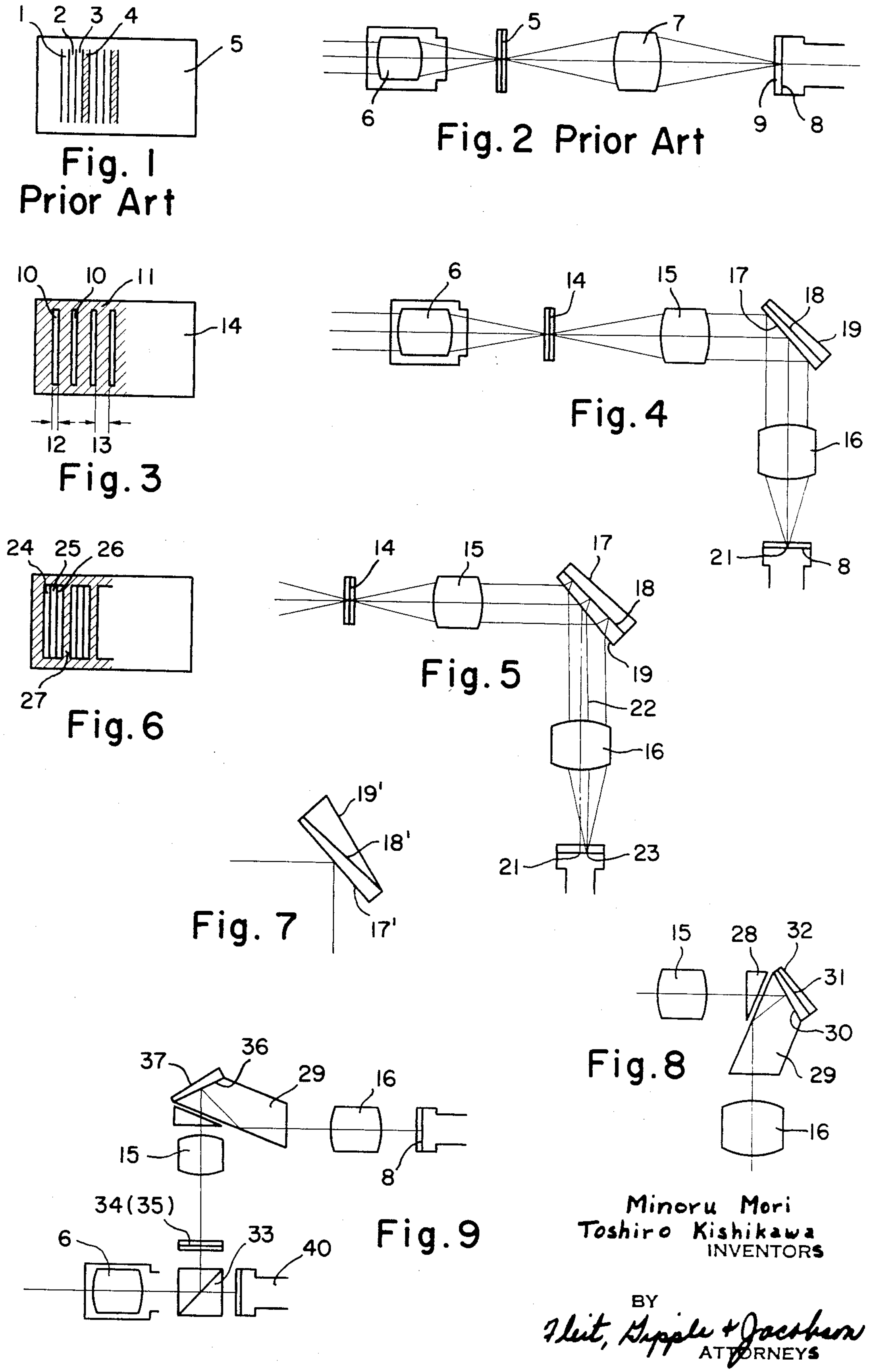
Fig. 1 Prior Art, Fig. 2 Prior Art, Fig. 3, Fig. 4, Fig. 5, Fig. 6, Fig. 7, Fig. 8, Fig. 9
FIG. 1 is a front elevational view of a conventional stripe filter.
FIG. 2 is a diagrammatical illustration showing the basic arrangement of a lens system using the stripe filter of FIG. 1.
FIG. 3 is a front elevational view of a stripe filter according to the present invention.
FIGS. 4 and 5 are diagrammatical illustrations showing the basic arrangements of the lens systems according to the invention respectively.
FIG. 6 is a front elevational view of the image of the stripe filter, formed on the photoelectric surface of an image tube.
FIGS. 7, 8 and 9 are diagrammatical illustrations showing the basic arrangements of other embodiments of the lens systems according to the invention.

Referring to the drawings and particularly to FIGS. 1 and 2 which show a conventional arrangement, a stripe filter 5 commonly used in a phase separation type, single tube color television system, comprises color stripes 1, 2, and 3, for example, of red, green and blue colors respectively, and black stripes 4 as shown in FIG. 1, said color stripes 1, 2, and 3 being composed of an absorption type color filter or multi-layer film. On the filter, normally 80 to about 100 sets of stripes, each consisting of the stripes 1 to 4, are arranged within the necessary image area.

FIG. 2 shows a lens system utilizing such stripe filter 5 and an image of an object is focussed on the stripe filter 5 by a taking lens 6, and said image and the stripes 5 are focused on the photoelectric surface 8 of an image tube by a relay lens 7. If the stripe filter is located in the same plane as the photoelectric surface 8 of the image tube, the relay lens 7 would be unnecessary, but at the present time it is impossible to produce the photoelectric surface of such color stripes. If the stripe filter 5 is positioned as close to the photoelectric surface 8 as possible, it will be spaced somewhat from the latter due to the presence of a face plate 9 in front of said photoelectric surface 8, and a sharp image of the stripe filter 5 cannot be obtained. At the present time, therefore, there is no other way than positioning the color stripe filter 5 at a location remote from the photoelectric surface 8 and forming the image of the stripe filter on the photoelectric surface 8 by means of a relay lens system.

As the stripe filter for such a color television system as described above, an absorption type color filter and a multi-layer film can be used. The absorption type color filter can be produced relatively easily but causes a great loss of light quantity, whereas the multi-layer film causes a relatively small loss of light quantity but is very difficult to produce. Furthermore, in either case the width of the stripes cannot be reduced more than a certain limit and the resolving power is also limited, so that the size of the image area on the stripe surface cannot be made smaller than a certain size. Therefore, the lens system including the taking lens inevitably becomes large and the cost of the color stripe filter becomes high accordingly.

The present invention aims to obtain the same effect as obtainable from the color stripe filter, by the combined use of a monochrome stripe filter and a lens system, without using the color stripe filter.

The present invention will be described in detail hereunder with reference to FIGS. 3 and onwards: FIG. 3 shows a monochrome stripe filter 14 used in the present invention. Stripes 10 are transparent white portions formed in equal width in a black portion 11 of a light-impervious plate as by photographic etching. The stripes 10 are arranged at a predetermined pitch over the entire area of the black portion 11 and the width thereof is about one third of the interval 13 between adjacent stripes. It will be obvious that such a monochrome stripe filter can be produced at a low cost even when the width of the stripes formed thereon is considerably small.

Referring to FIG. 4, an image of an object is formed on the monochrome stripe filter 14 of the type shown in FIG. 3, by a taking lens 6. The image of the object and the image of the stripe filter 14 which is positioned with its longitudinal length extending at right angles to the sheet of FIG. 4, are formed on the photoelectric surface 8 of an image tube through two relay lenses 15, 16 and color separating reflecting surfaces 17, 18 and 19. The ray pencil between the relay lenses 15 and 16 is completely parallel and the color separating reflecting surface 17 is a dichroic surface which is adapted to reflect only part of the visible light, e.g., a red color light and pass the other lights. The color separating reflecting surface 18 is a dichroic surface which is adapted to reflect only part of the color light passing through the reflecting surface 17, e.g., a green color light, and pass the remaining color light. The reflecting surface 19 is an ordinary reflecting surface which does not have a wavelength selecting property and reflects the remaining blue color light, as the red color light and green color light have already been reflected by the aforesaid two reflecting surfaces.

The reflecting surfaces 17, 18, and 19 are arranged, not parallel to each other but at angles of inclination slightly different from each other. Now, considering the ray pencil passing through the central stripe of the stripe filter, for instance, the red color ray pencil of the white light, paralleled by the relay lens 15, is reflected on the reflecting surface 17 and focussed at the central portion 21 of the photoelectric surface 8 by the relay lens 16 in the form of a red stripe. The green color ray pencil passing through the reflecting surface 17 is reflected on the reflecting surface 18 and proceeds towards the relay lens 16 via the reflecting surface 17, as shown in FIG. 5. However, since the reflecting surfaces 17 and 18 are not parallel but inclined relative to each other as stated above, the green color ray pencil is focussed not at the center 21 of the photoelectric surface 8 but at an adjacent portion 23 in the form of a green stripe (FIG. 5). The amount of deviation of the adjacent portion 23 from the central portion 21 can be readily calculated from the difference in angle of inclination between the reflecting surfaces 17 and 18, and the focal distance of the relay lens 16. Further, since the ray pencil is paralleled between the relay lenses 15 and 16, the quality of the image formed through said reflecting surfaces is not degraded at all, and the red stripe image formed at the central portion 21 and the green stripe image formed at the adjacent portion 23 are completely in one and the same plane.

The color light, i.e., the blue color ray pencil, which passes through the reflecting surfaces 17, 18 and is reflected on the reflecting surface 19, is obviously focused at a location further deviated from the green stripe on exactly the same principle as the aforesaid two ray bundles.

Although the foregoing description has been given on the stripe at the center of the stripe filter, it will be obvious that exactly the same thing can be said on the stripes at the other locations of the stripe filter.

Therefore, when the photoelectric surface 8 is viewed in the direction of the optical axis, stripes 24, 25 and 26 shown in FIG. 6 are in red, green and blue colors respectively and a stripe 27 is black color. It will be understood that, by making the interval between the adjacent stripes on the stripe filter three times as large the width of each stripe, as stated previously with reference to FIG. 3, the width of the black stripe 27 can be made equal to that of the other stripes. Such stripes are formed from one end to the other end of the image surface continuously in the sequence mentioned above.

By arranging as described above, it is possible to obtain a lens system having the same effect as a color stripe, using a mere dichrome stripe of the type shown in FIG. 3 and by optical means comprising dichroic reflecting surfaces having different angles of inclination, without using the color stripe of FIG. 1.

FIG. 7 shows another form of the dichroic mirror, in which the relative angle of inclination of the reflecting surfaces is varied to change the arrangement of the three color stripes.

When the angle of incidence of the ray pencil relative to the dichroic reflecting surface 17 or 18 is close to 45° as shown in FIG. 4 or 5, the so-called color shading tends to occur, but it is easy to evade such color shading by composing a three color separation system with prisms 28 and 29 and applying the arrangement of the present invention to reflecting surfaces 30, 31, and 32, as shown in FIG. 8.

The concept of the present invention can also be very easily applied to the chrominance channel line of a so-called separated luminous system wherein a luminance channel line is provided optically in addition to the chrominance signal line, or of a so-called separated luminous system wherein the luminance signal is used for the green signal line and the chrominance signal line is separated into two colors of red and blue, and in these cases the system will be of a two tube type. The lens system of the false separated luminous system is shown in FIG. 9. In this case, a dichroic mirror 33 passes a green color ray bundle to be received by a second image tube 40 and reflects the remaining color lights. The interval of the white portions 35 on a stripe filter 34 is about twice as large as the width thereof. A dichroic reflecting surface 36 reflects a red color ray bundle and a reflecting surface 37 is an ordinary reflecting surface which does not have a wavelength selecting property. Thus, it will be obvious that a red, blue and black stripe images are formed in sequence on the photoelectric surface 8.

Although the present invention has been described and illustrated herein in detail with reference to a preferred embodiment thereof, it should be understood that the invention is not restricted to the detailed arrangement of said embodiment and many changes and modifications are possible within the scope of the appended claims.

What is claimed is:

1. A color television camera, comprising a taking lens, an image tube having a photoelectric surface, a monochrome stripe filter positioned at the focal point of said taking lens, a relay lens to form the light passing through said filter into a parallel light, dichroic means having three dichroic surfaces for separating the light from said relay lens into three color lights and directing said respective color lights at angles slightly different from each other, and a second relay lens for focussing the ray pencil from said dichroic means on the photoelectric surface of said image tube.

2. A color television camera as defined in claim 1, wherein said monochrome stripe filter consists of transparent stripes of equal width formed on a black color plate in equally spaced relation, the width of said transparent stripes being one-third of the width of the black stripe formed between adjacent ones of said transparent stripes, and the white light passing through each stripe is separated into three color lights by the dichroic means, each of which color lights is focused on the photoelectric surface of the image tube in adjacent relation to each other.

3. A color television camera as defined in claim 1, wherein said dichroic means has three dichroic reflecting surfaces, the angles of inclination of which slightly differ from each other.

4. A color television camera as defined in claim 3, wherein the difference in angle of inclination between the adjacent dichroic reflecting surfaces is so selected that the color lights reflected on the respective surfaces are focussed on the photoelectric surface in adjacent relation to each other.

5. A color television camera as defined in claim 1, wherein said dichroic means has prism means combined therewith for preventing a color shading.

6. A color television camera as defined in claim 1, wherein second dichroic means is arranged between the taking lens and the monochrome stripe filter, which is adapted to pass only one of the three color lights while reflecting the other color lights, and the lights reflecting on said second dichroic means pass through said monochrome stripe filter, and further a second image tube is provided for receiving said one color light passing through said second dichroic means.

7. A color television camera as defined in claim 6, wherein said monochrome stripe filter includes alternately arranged black stripes and transparent stripes, and the width of said transparent stripes is the half of the width of said black stripes.

* * * * *